United States Patent
Foley et al.

(10) Patent No.: US 7,372,928 B1
(45) Date of Patent: May 13, 2008

(54) METHOD AND SYSTEM OF CYCLE SLIP FRAMING IN A DESERIALIZER

(75) Inventors: Sean Foley, Cork (IE); Carel Lombaard, Co. Cork (IE); Tony Blake, Co. Cork (IE); Paul Scott, San Jose, CA (US); Mohamed Sardi, Santa Clara, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 781 days.

(21) Appl. No.: 10/295,736

(22) Filed: Nov. 15, 2002

(51) Int. Cl.
*H04L 7/00* (2006.01)
(52) U.S. Cl. ...................... 375/354; 327/173
(58) Field of Classification Search ............... 375/354, 375/111, 116, 108, 368; 370/100, 80, 505, 370/366, 342; 341/100; 327/172–175
See application file for complete search history.

(56) References Cited

U.S. PATENT DOCUMENTS

| | | | |
|---|---|---|---|
| 3,983,325 A * | 9/1976 | Ollinger et al. | 375/369 |
| 4,674,088 A * | 6/1987 | Grover | 370/506 |
| 4,744,081 A * | 5/1988 | Buckland | 370/514 |
| 4,768,188 A * | 8/1988 | Barnhart et al. | 370/434 |
| 4,979,192 A * | 12/1990 | Shimizume et al. | 375/362 |
| 5,050,171 A * | 9/1991 | Ishijima | 714/798 |
| 5,592,518 A * | 1/1997 | Davis et al. | 375/368 |
| 5,838,749 A * | 11/1998 | Casper et al. | 375/376 |
| 6,265,996 B1 | 7/2001 | Duffy | |
| 6,507,592 B1 * | 1/2003 | Hurvig et al. | 370/503 |
| 6,535,527 B1 | 3/2003 | Duffy | |
| 6,539,051 B1 | 3/2003 | Grivna | |
| 6,625,240 B1 * | 9/2003 | Miyahara | 375/366 |
| 6,696,995 B1 | 2/2004 | Foley et al. | |
| 6,763,036 B1 | 7/2004 | Maas et al. | |
| 6,970,115 B1 | 11/2005 | Sardi et al. | |
| 6,973,101 B1 | 12/2005 | Grivna | |
| 7,069,407 B1 | 6/2006 | Vasudevan et al. | |
| 7,245,725 B1 | 7/2007 | Beard | |

* cited by examiner

*Primary Examiner*—Jean B. Corrielus

(57) ABSTRACT

A method and system for cycle slip framing is disclosed. The method includes receiving an asynchronous signal and generating a synchronous pulse after receiving the asynchronous signal. The method further provides that the synchronous pulse be used to affect a bit slip that results in the moving of a character frame in the recovered data of a deserializer. According to one embodiment of the invention, the moving of the character frame is prompted by a single control signal of a clock divider circuit which causes the removal of a single clock cycle of a clock signal supplied to said deserializer.

20 Claims, 10 Drawing Sheets

800

METHOD AND SYSTEM OF CYCLE SLIP FRAMING IN A DESERIALIZER

TECHNICAL FIELD

Embodiments of the present invention relate generally to the framing of data bits moving in a serial bit data stream. In particular, embodiments of the present invention relate to a method and system for cycle slip framing of data bits moving in a serial bit data stream.

BACKGROUND ART

A particularly useful (and marketable) feature of data communication transceiver (PHY) chips is the receiver's ability to "frame" its outputs upon recognition of a special framing character in the incoming serial data stream. Framing is used in normal-mode to re-frame data in backplane transceivers and is an integral part of the IEEE 802.3z Gigabit Ethernet and Fiber Channel Standards.

Framing is also used for built-in-self-test (BIST) purposes and to this end many transceiver chips (both backplane and port-SONET/SDH) include a PRBS (pseudo-random bit stream) generator in the transmitter channel and a corresponding verification block in the receiver. The function of the verification block is to determine if the received character matches the framing character. If framing is not achieved, then the verification block requests the deserializer block to "slip a bit" from the incoming serial bit stream and thus move the imaginary frame forward by one bit. This process continues until the character presented at the outputs of the deserializer block matches up with the special framing character and at this point framing is said to be achieved. Irrespective of the application, a common and important requirement for the deserializer circuit in the receiver is the ability to move an imaginary character frame across the incoming serial data stream one-bit at a time until framing is achieved.

FIG. 1 is a diagram that illustrates a basic building block component of a pipelined deserializer that uses each cycle of a divided clock to grab successive bits from a serial bit stream. The basic building block of this architecture is the 1-to-2 DEMUX cell illustrated in FIG. 1. The cell consists of 2 D-type flip-flops (DFF) and a latch. FIG. 2 illustrates the functionality of the cell illustrated in FIG. 1 using waveforms.

As is shown in FIG. 1, incoming data 107 is wired to the data inputs of two DFFs 101 and 103. A negative-edge-triggered DFF 101 on the top row clocks the data on the falling edge of clock 109 thereby capturing the "odd" data bits (see FIG. 2, shown as bits a, c and e that are outputs of the negative-edge-triggered DFF) travelling in a serial bit data stream. The positive-edge-triggered DFF 103 on the bottom row clocks the data on the rising edge of clock thereby capturing the "even" data bits (See FIG. 2, shown as bits b, d and f that are outputs of the positive-edge-triggered DFF) travelling in the serial bit data stream. The output of the DFF 101 on the top-row is then passed to a latch 105. The latch 105 is connected so that it goes transparent when the clock goes high. This effectively delays the "odd" data stream by half a clock cycle (see three bottom waveforms in FIG. 2). The outcome of this half-cycle delay is that the "odd" and "even" data streams are both aligned to the rising edge of the clock at the outputs of the 1-to-2 DEMUX cell (see FIG. 2).

A pipelined deserializer is therefore constructed by connecting 1-to-2 DEMUX cells in a tree-like structure as shown in FIG. 3. FIG. 3 illustrates a configuration of four pipelined stages of DEMUX cells that form a 1-to-16 deserializer 50. As is illustrated in FIG. 3, the data streams out of each stage (n=4 stages) in the pipeline move at half the rate of the data streams moving into that stage. The clock rate for each stage is therefore derived by dividing the clock for the previous stage by two. The simplest implementation of the clock divider is a series of toggle flip-flops connected together to form a 4-bit binary ripple counter. The major advantage of this architecture over other architectures (such as full-rate or half-rate) is that each successive stage performs twice as many demultiplexing operations as the previous stage and each successive stage operates at half the speed of the previous stage. This means that most of the demultiplexing operations are performed at speeds much lower than the top-speed of the block which permits much lower power cells to be used.

FIG. 4 shows a conventional implementation as described in U.S. Pat. No. 5,128,940 of a slip-bit mechanism with a pipelined deserializer architecture 407 such as described in FIG. 3. As illustrated in FIG. 4, this architecture uses an EXOR gate (401a-401c) in the clock path of each stage n of the pipeline. The inputs to each EXOR gate are a respective control signal (403a-403c) and a clock signal for that particular stage. If the control signal to a particular EXOR gate is HIGH then the output of the EXOR gate is the inverse of the clock signal input and if the control signal is LOW then the clock signal is simply buffered by the gate (non-inverted). In a $1:2^N$ demultiplexer (deserializer), $2^N$ types of bit-shifts are required. Importantly, n control signals are required in order to effect these bit shifts.

The disadvantages of these conventional cycle-slip schemes include the necessity of employing N control signals and using a framing verification block that is capable of generating them and the requirement that N (EXOR) gates be used to produce the divided clock signals. It should be appreciated that the use of such gates render such circuits not "correct-by-design". This is because it is not feasible to perfectly synchronize both inputs to each EXOR gate (the N control signals and the clock signals). When these inputs are asynchronous, then glitches will appear at the outputs of the EXOR gates. Depending on how narrow or wide the glitches are, the effects on the deserializer will vary. These glitches can lead to one or more invalid data characters appearing at the outputs of the deserializer, which in turn can lead to unwanted system effects such as false framing. When the clock to a particular stage in the pipeline gets inverted, then the timing of the data outputs of that stage are correspondingly shifted. Thus to avoid metastability and to ensure the correct operation of successive stages, it is necessary to include N–1 D-Flip-Flops (DFF) along with the N EXOR gates in order to re-synchronize subsequent stages as is illustrated in FIG. 5, thereby introducing more complexity into the clock generation circuitry; See U.S. Pat. No. 5,128,940.

SUMMARY OF THE INVENTION

Accordingly, a need exists for a method and system that provides a cost effective means of prompting a deserializer circuit to slip a bit on-demand from the incoming serial bit data stream. The present invention provides a method and system which accomplishes the above mentioned need.

For instance, one embodiment of the present invention provides a method and system for cycle slip framing performed at a receiver of a serial data stream. The method includes receiving an asynchronous control signal regarding a serial bit data stream and generating a synchronous pulse after receiving the asynchronous control signal. The method further provides that the synchronous pulse be used to affect a bit slip that results in the moving of a received character frame. According to one embodiment of the invention, the moving of the character frame is prompted in response to a single control signal at the receiver.

According to one embodiment, the receiving of a slip bit signal results in the removal of a clock cycle at the receiving end by using a synchronous pulse to affect a bit slip thereby causing the skipping of a data bit from an incoming serial stream.

The method of cycle slip framing can be used in the Rx channel of transceiver chips where the deserializer is required to "frame" its outputs upon the recognition of a special framing character in the incoming serial data signal. In particular, embodiments may be used with deserializer architectures which rely on each edge/cycle of a divided clock to grab consecutive bits from a serial bit stream. The method for framing serial data uses a logical-state-machine which controls the clock of a deserializer mechanism and performs the following steps. First, the incident clock is divided by two for "normal" events, e.g., non-slip events. Second, a clock cycle is removed when requested by an external agent according to a control signal that may be asynchronous. Third, the usual clock divider functions are resumed on the next clock cycle. In one embodiment, the logical-state-machine is comprised of four flip-flops and two gates which are used to implement the divide by two/three function synchronously with the incident clock. The deserializer mechanism may be comprised of cascaded storage elements clocked by successively slower clocks.

The embodiments of the present invention provide a receiver circuit having a deserializer block that is capable of performing cycle slip framing that is synchronous in that all clocks are outputted directly from flip-flop circuits. Even if the control signal is asynchronous to the deserializer block, according to embodiments of the present invention, glitches will not enter the system and will therefore be prevented from causing invalid characters with unknown system effects. Moreover, the embodiments of the present invention require only one control signal to effect a bit-slip and move the character frame. The conventional art requires N controls, one for each of the N stages of the deserializer. Further, the embodiments of the present invention require only 3 DFFS, 1 AND gate and 1 MUX, as opposed to N EXOR gates plus N−1 DFFs as used in the conventional art, where N is the number of stages in the deserializer.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Cycle Slip Framing in a Deserializer

Figure 6:
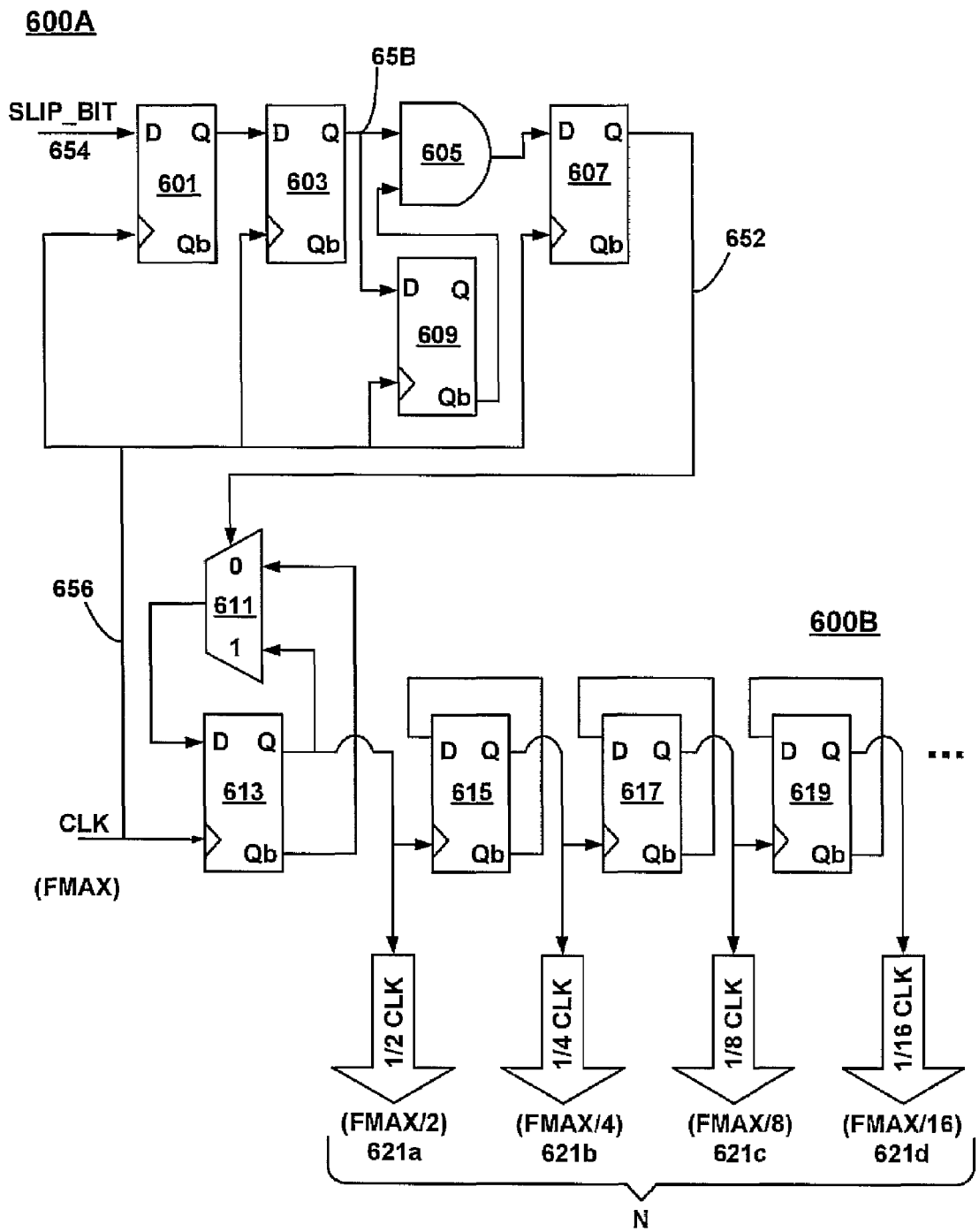
FIG. 6 is a diagram of a slip bit mechanism and associated clock divider circuit according to one embodiment of the present invention.

FIG. 6 is a diagram of a slip bit mechanism 600A and associated clock divider circuit 600B according to one embodiment of the present invention. As described further below, these circuits may be used in conjunction with a bit deserializer circuit where the clocks supplied to the deserializer originate from circuit 600B. The entire circuit may be used in a receive channel of a transceiver circuit in accordance with one embodiment of the present invention. According to one embodiment, the slip bit mechanism can be used to trigger the delay of a clock edge of a clock signal produced by the clock divider circuit of the deserializer. Because each clock edge of the clock signal produced by the clock divider circuit is used to catch a single bit from a serial bit data stream, the missing edge causes a single data bit to be slipped. At any point in time, a parallel data character that is present at the outputs of the deserializer represents a character frame of the serial bit data stream. Every time a bit is slipped the parallel data character that is present at the outputs of the deserializer represents a frame that has moved forward in the serial bit data stream by one data bit.

It should be appreciated that the embodiments of the invention could be used in any deserializer system, operating at half-clock rate or slower, which relies on each clock cycle of a clock signal to facilitate the capture of a data bit from a moving serial bit data stream. According to one embodiment, as illustrated by the circuit shown in FIG. 6, a clock divider may be implemented using toggle flip-flops configured as a binary ripple counter. In other embodiments other implementations of the clock divider may be employed.

According to one embodiment, the slip bit mechanism 600A may be implemented utilizing 4 DFFs, 1 AND gate and 1 MUX (multiplexer) connected as is illustrated in FIG. 6. Referring to FIG. 6, there is shown slip bit mechanism 600A including D type flip flops (DFFs) 601, 603, 607, and 609, AND gate 605, and MUX 611. In addition, FIG. 6 shows clock divider circuit 600B including D type flip flops 613, 615, 617 and 619 with clock divider circuit outputs 621a-621d.

Slip bit mechanism 600A generates a synchronous pulse over line 652 that is used to trigger the delaying of a clock edge of a clock signal that is supplied to a deserializer. Because each clock edge of the clock signal produced by the clock divider circuit is used to catch a single bit from a serial bit data stream, this delay causes a single data bit moving in the serial bit data stream to be slipped (e.g., missed). According to one embodiment, this operation may be employed to facilitate the re-framing of data that has an indeterminate delay between transmitter and receiver.

Slip bit mechanism 600A facilitates the re-framing of data as it was aligned or framed at the transmitter by triggering data bit slips a single bit at a time until framing of incoming data is achieved at the receiver. Referring to FIG. 6, D type flip flops (DFFs) 601, 603, 607, and 609, and AND gate 605 operate together to generate a synchronous pulse (equal in length to one full rate clock cycle) each time that a slip bit signal is received over line 654. This synchronous pulse may then be transmitted to a MUX (e.g., 611) via line 652 which generates a control signal (for transmission to the clock divider circuit) that may be employed to trigger a data bit slip.

Figure 8:
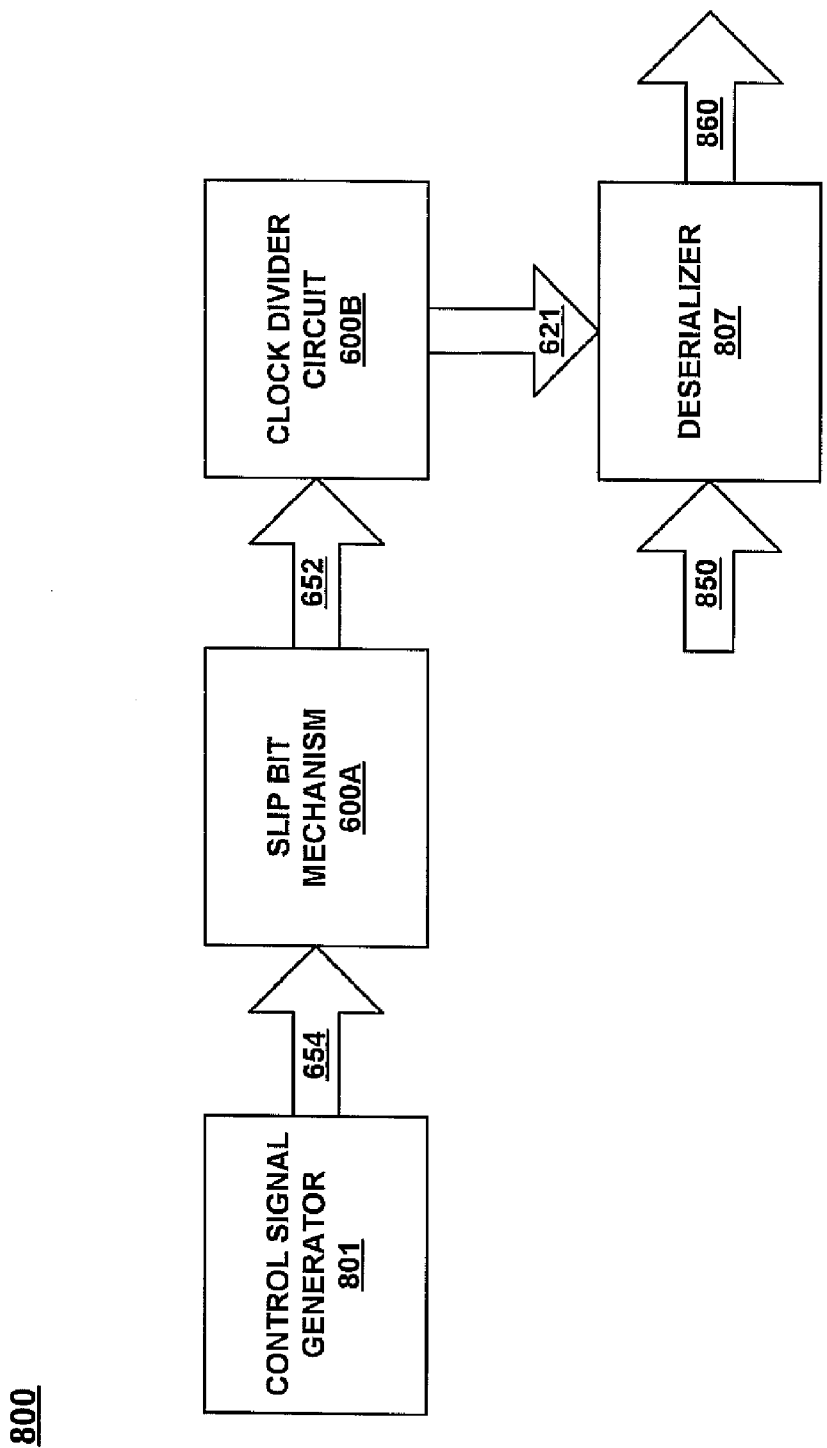
FIG. 8 shows a functional block diagram that illustrates the interrelationship between system functional blocks according to one embodiment of the invention.

MUX 611 receives a synchronous pulse (over line 652) from slip bit mechanism 600A and produces a control signal for transmission to the clock divider circuit 600B. Clock divider circuit 600B supplies clock signals to a deserializer circuit (FIG. 8). When the clock divider circuit 600B receives a control signal over line 652 the supply of a clock edge of a clock signal produced by the clock divider circuit may be delayed by one clock cycle thereby delaying the triggering of the deserializing operations of the deserializer circuit for that cycle. This action can cause a data bit to be slipped (missed) by delaying the clocking (capturing) of data moving in a serial bit data stream by one clock cycle. Clock divider circuit 600B supplies clock signals 621a-621d to a deserializer circuit. According to one embodiment, the clock divider circuit may be implemented using toggle flip-flops configured as a binary ripple counter. In other embodiments other implementations of the clock divider may be employed. The circuit 600B can be expanded by adding flip flop stages to 619 to accommodate any number, N, of stages. Each clock signal 621a-621d corresponds to a respective stage of the deserializer (FIG. 8).

Figure 7:
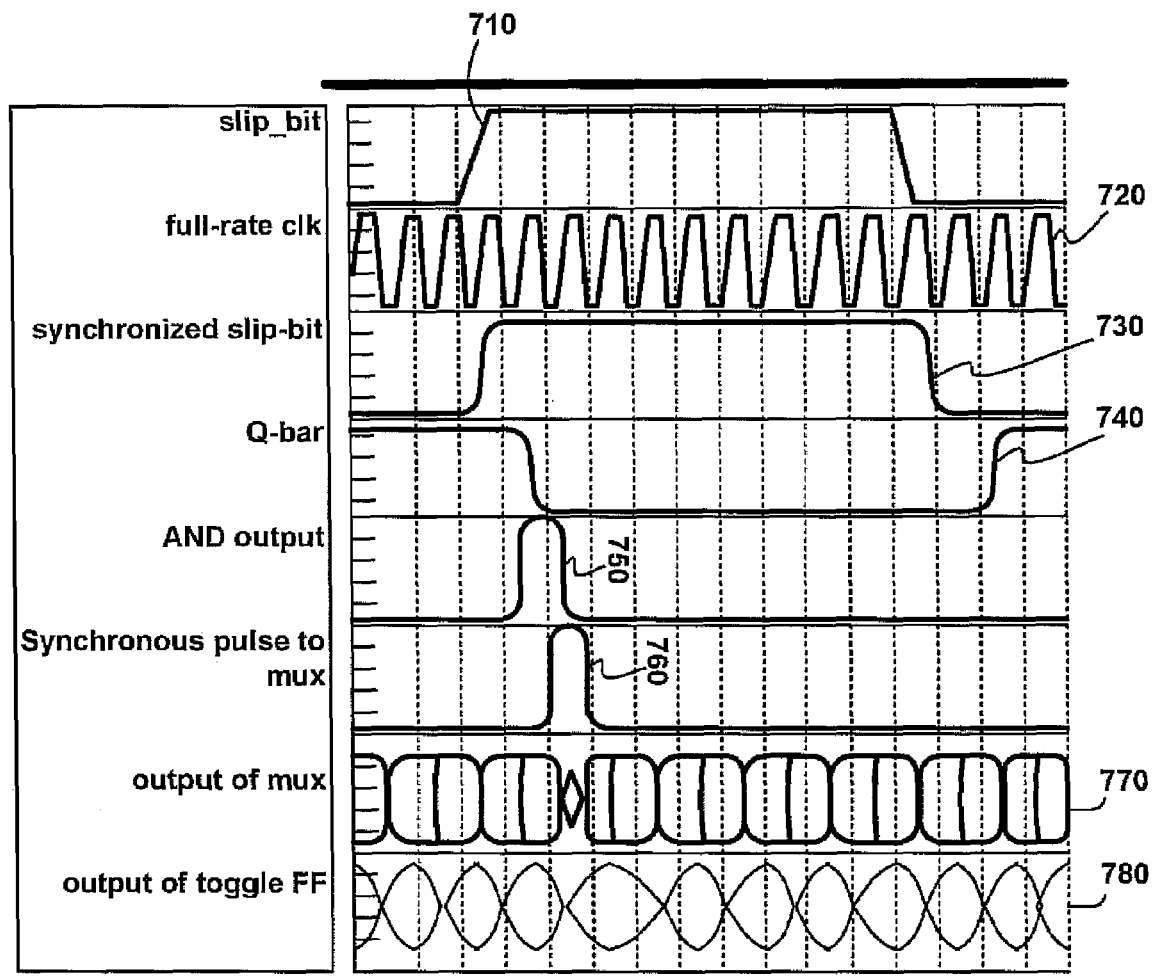
FIG. 7 shows waveforms that describe the operation of the slip-bit circuit according to one embodiment of the present invention.

FIG. 7 shows waveforms that describe the operation of the slip-bit circuit according to one embodiment of the present invention. FIG. 7 is discussed below with reference to the corresponding circuit elements of FIG. 6. Referring to FIG. 7, when the asynchronous slip-bit signal on line 654 is asserted high 710, thus "requesting" the deserializer to slip (skip) a data bit from the incoming serial bit data stream, the slip-bit signal is passed through a series of DFFs (e.g., 601 and 603 to reduce the risk of metastability) where it is synchronized to the internal full-rate clock 656 and 720 (FIG. 7). The synchronous slip-bit signal over line 658 and shown as 730 (FIG. 7) is then supplied both to one input of an AND gate (e.g., 605) and to the data input of a positive edge DFF (e.g., 609 which is also clocked with the full-rate clock). The other input of the AND gate is supplied from Q-bar 730 (FIG. 7) of DFF 609. For one full-clock cycle between the synchronous slip-bit signal going high and that high propagating through the DFF on the next rising edge of the clock both inputs to the AND gate 605 are high which results in a high AND output 750 as is shown in FIG. 7.

However, on the next rising edge of the clock, Q_bar of the DFF goes low and the pulse out of the AND gate (e.g., 605) is terminated. The pulse 750 from the AND gate 605 is then re-synchronized to the full-rate clock using DFF 607. The synchronized control signal is shown in waveform 760 and is supplied over line 652. The arrangement of 4 DFFs and 1 AND gate constitutes a synchronous pulse generator that generates a synchronous pulse 760 (equal to one full-rate clock cycle in length) every time the slip-bit signal 710 is asserted high. Importantly, as can be seen in FIG. 7 no such pulse is generated when the slip-bit signal is de-asserted.

The synchronous pulse 760 is then fed over line 652 to the select input of a 2-to-1 MUX (e.g., 611) which sits in the feedback path of the first toggle flip-flop (e.g., 613). The MUX selects between the Q and the Q-bar of the flip-flop 613. As can be seen in diagram 770 of FIG. 7, this can result in a glitch being formed at the output of the MUX. However, this glitch is hidden since the output of the MUX (the data input to the DFF) is not evaluated again until the next rising edge of the clock. The net result is that the clock divider circuit 600B has "lost" an edge as shown in diagram 780 which illustrates the output of flip flop 613.

FIG. 8 shows a functional block diagram that illustrates the interrelationship between system functional blocks according to one embodiment of the invention. FIG. 8 shows asynchronous control signal generator 801, slip bit mechanism 600A, clock divider 600B, and deserializer 807.

Asynchronous control signal generator 801 generates the asynchronous control signal (slip bit signal) 654 that triggers the operation of slip bit mechanism 600A. According to one embodiment, the asynchronous slip bit signal may be passed through a series of circuit components where it is synchronized to an internal full rate clock and is transformed into a synchronized control signal.

Figure 1:
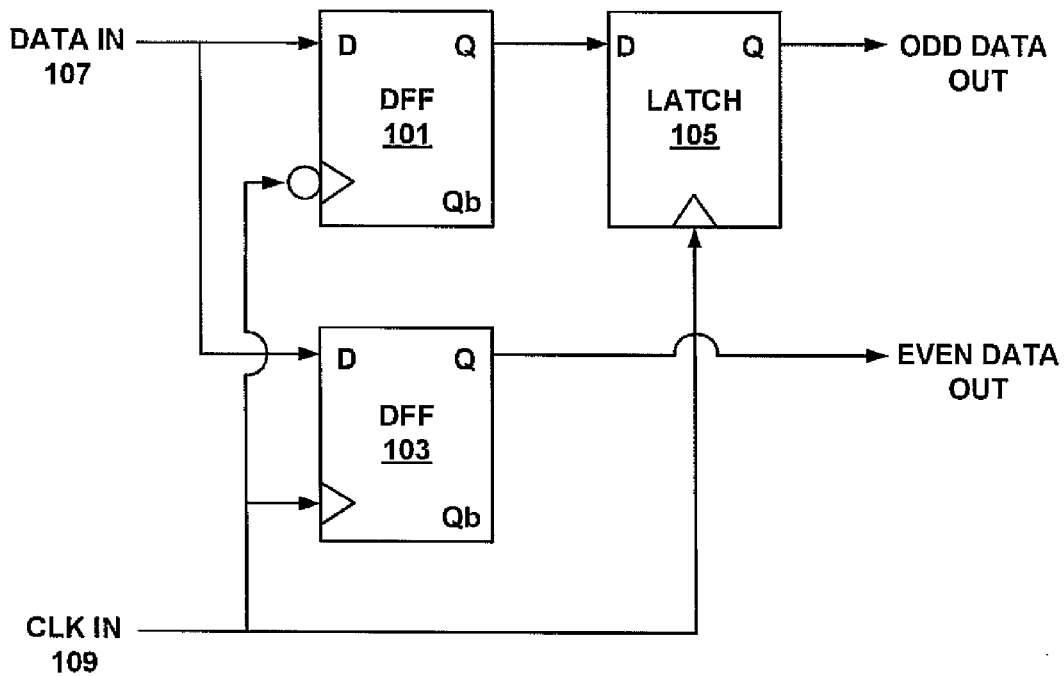
FIG. 1 is a diagram that illustrates the basic building block component of a pipelined deserializer.
Figure 2:
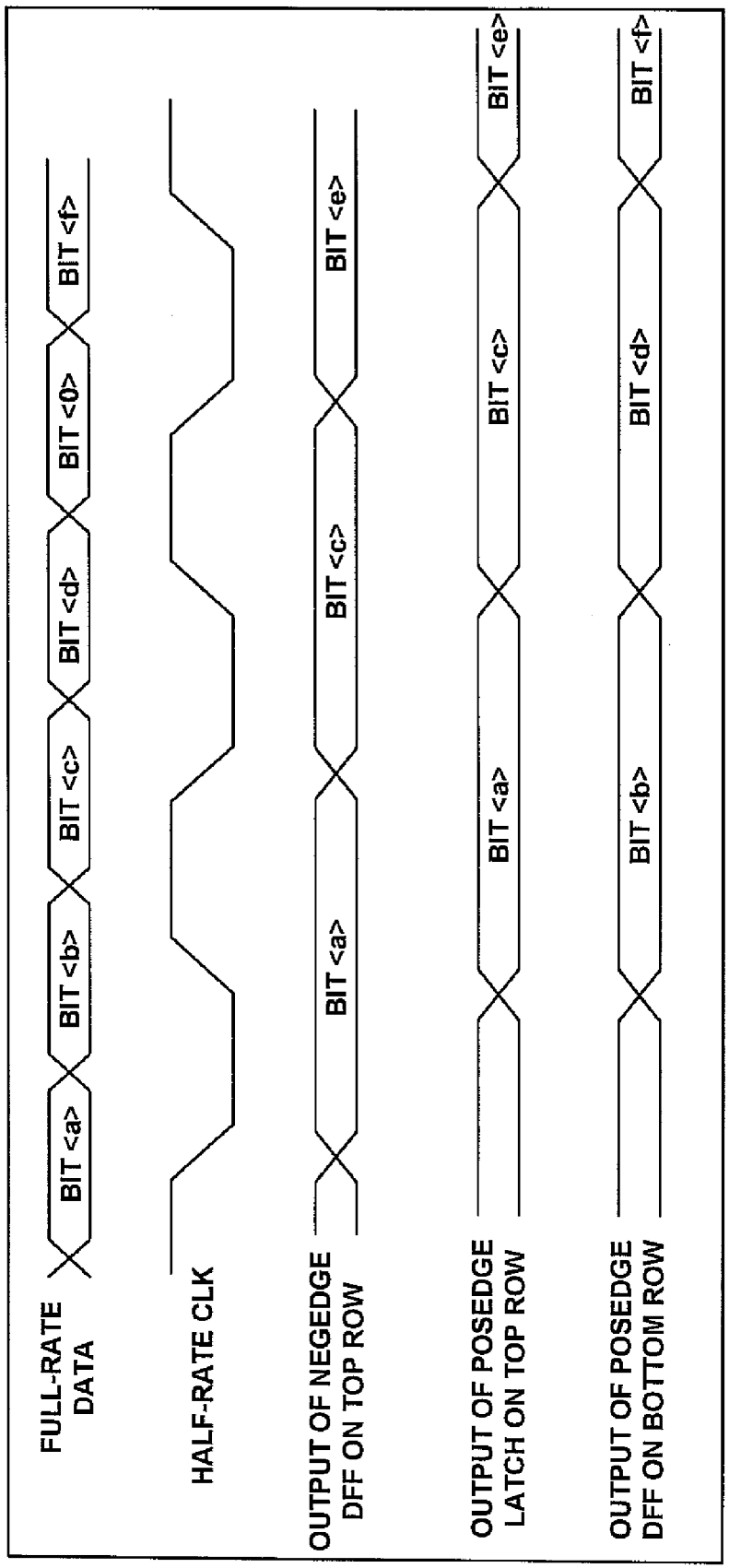
FIG. 2 illustrates timing diagrams of the functionality of the cell illustrated in FIG. 1 using waveforms.
Figure 3:
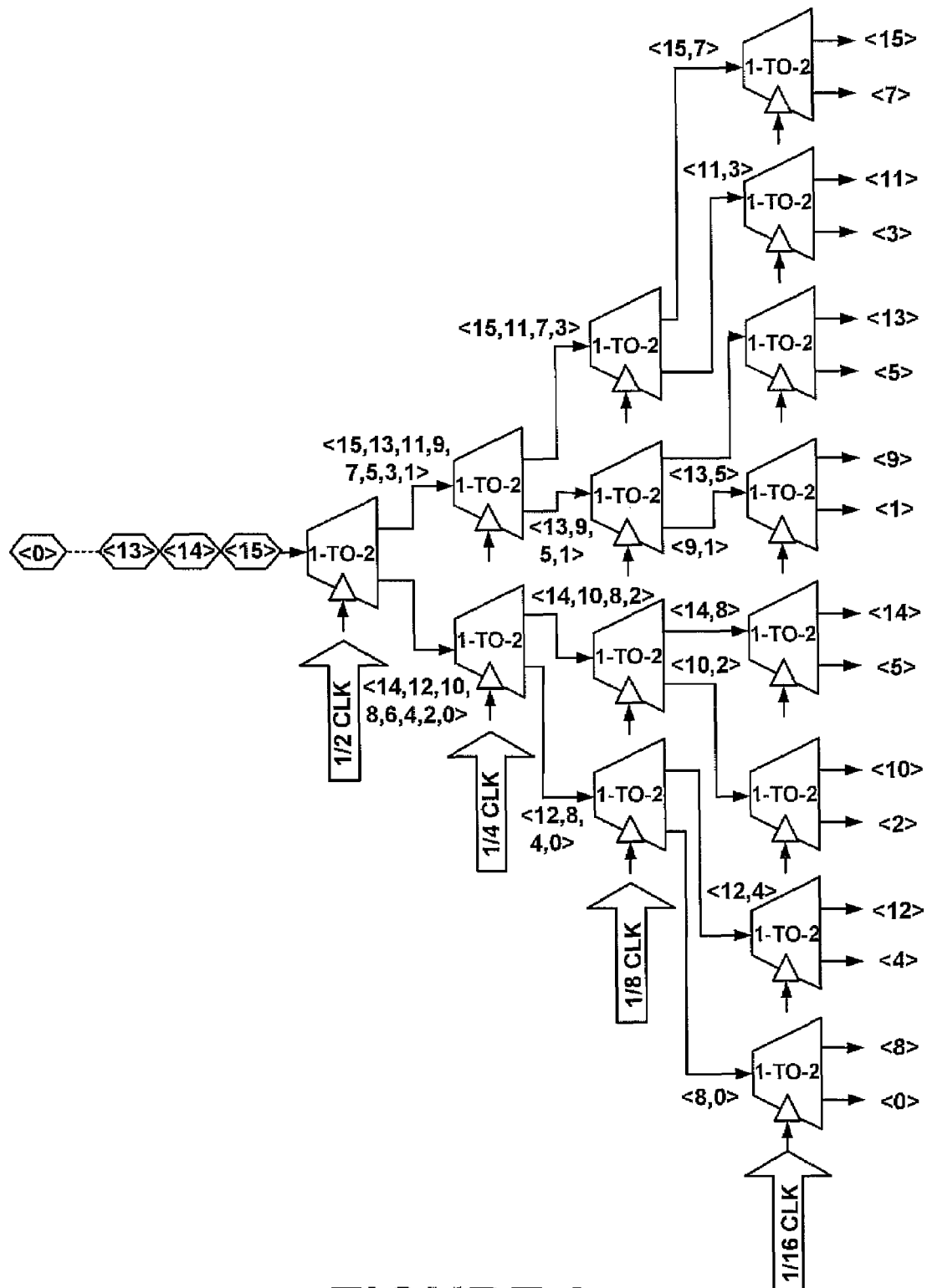
FIG. 3 illustrates a configuration of four pipelined stages to form a 1-to-16 deserializer, where N=4.
Figure 4:
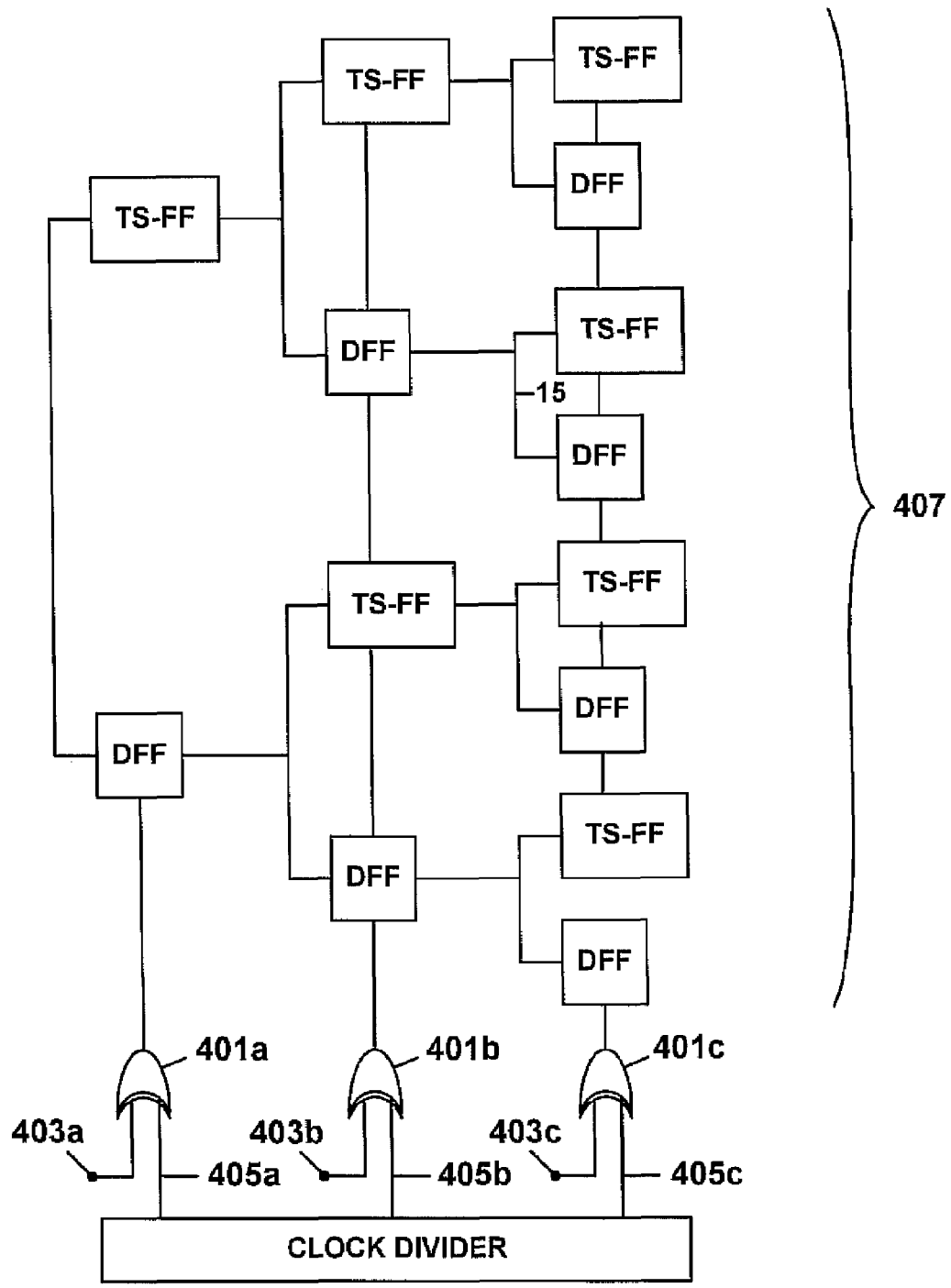
FIG. 4 shows a conventional implementation of a slip-bit mechanism with a pipelined deserializer architecture such as is described in FIG. 3.
Figure 5:
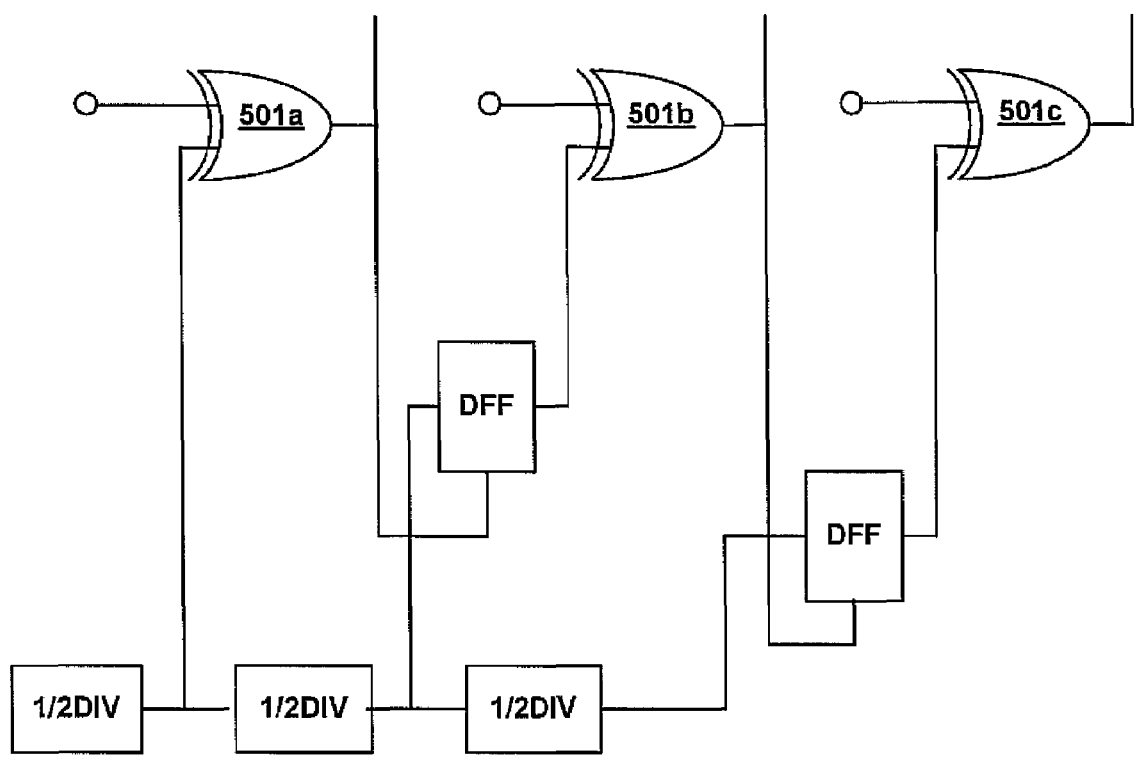
FIG. 5 shows an arrangement of N−1 D-Flip-Flops (DFF) along with the N EXOR gates used to re-synchronize the successive stages of a deserializer.

Slip bit mechanism 600A generates a synchronous pulse that is used to trigger the delaying of a clock edge of the clock signals 621 that are supplied to the deserializer 807. Any of a number of well known circuits can be used as deserializer 807, e.g., circuit 50 of FIG. 3. The exemplary deserializer 50 contains 4 stages with each stage receiving one of the divided clocks 621a-621d. The deserializer shown is a 1:16 deserializer where the number of stages equals 4. The deserializer 807 may be 1:2n to expand where n is the number of stages and also the number of divided clocks 621. Because each clock edge of the clock signal produced by a clock divider circuit is used to catch a single bit from a serial bit data stream, this delay causes a single data bit moving in the serial bit data stream to be slipped (missed).

According to one embodiment this operation may be employed to facilitate the re-framing of data that has an indeterminate delay between transmitter and receiver. Slip bit mechanism 600 facilitates the re-framing of data initially framed at the transmitter by triggering data bit slips a single bit at a time until framing of incoming data is achieved at the receiver 800. Referring to FIG. 6, D type flip flops 601, 603, 607, and 609, and AND gate 603 operate together to generate a synchronous pulse (equal in length to one full rate clock cycle) each time that a slip bit signal is received. This synchronous pulse may then be transmitted to a MUX (e.g., 611) which may generate a control signal (for transmission to the clock divider circuit) that can be employed to trigger a data bit slip.

Deserializer 807 receives clock signals 621 from the clock divider circuit 600B that trigger the demultiplexing of data moving in a serial bit data stream 850 to produce parallel data out 860. A demultiplexing operation may be triggered with each edge of the clock signal received from clock divider circuit 600B. The delay of a clock edge of the clock signal may be triggered by the synchronized control signal 652 that is generated by the slip bit mechanism. According to one embodiment this causes the deserializer to slip a bit (refrain from capturing a bit) from the incoming serial bit data stream.

Figure 9:
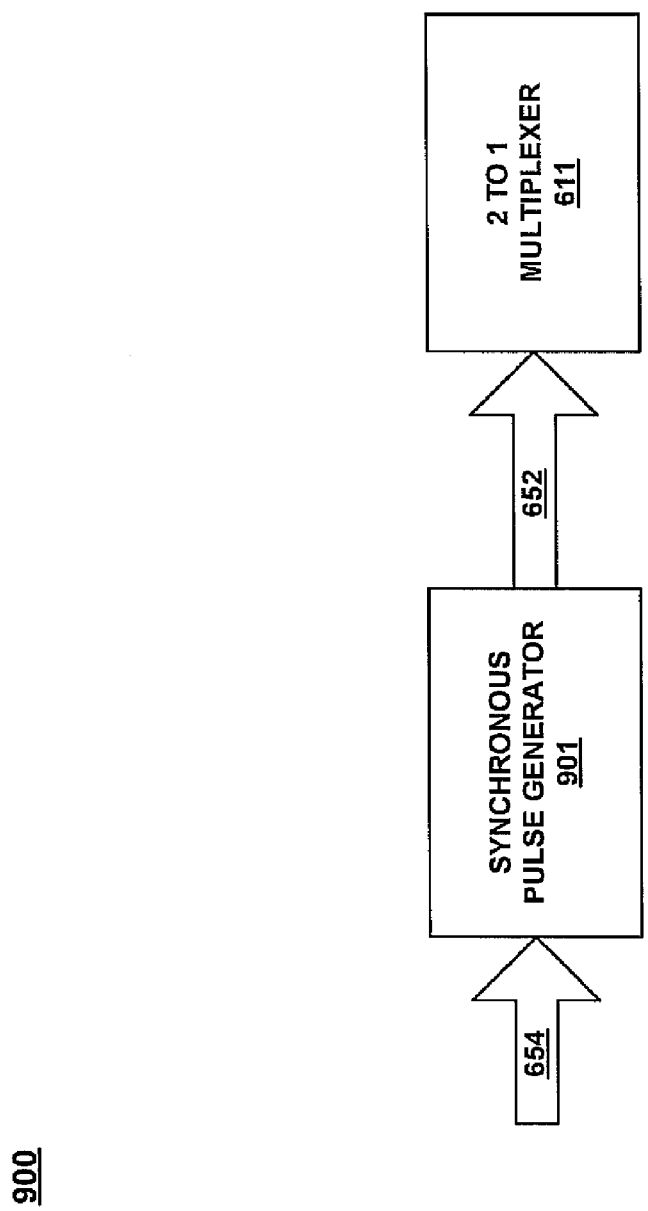
FIG. 9 is a functional block diagram illustrating the interrelationship between the synchronous pulse generator and the two to one MUX (multiplexer) according to one embodiment of the present invention.

FIG. 9 is a functional block diagram 900 illustrating the interrelationship between the synchronous pulse generator and the two to one MUX according to one embodiment of the present invention. FIG. 9 shows synchronous pulse generator 901 and two to one MUX 611.

Synchronous pulse generator 901 may receive an asynchronous slip bit control pulse 654 and may be comprised of an arrangement of flip flops and AND gate as shown in FIG. 6. In other embodiments other arrangements may be employed. The synchronous pulse generator 901 generates a synchronous pulse 652 each time an active level of the asynchronous control signal 654 is asserted. It should be appreciated that no such signal is generated when an active level asynchronous control signal is de-asserted.

2 to 1 MUX 611 receives synchronous pulses from synchronous pulse generator 901. The synchronous pulse is supplied to the select input of the two to one MUX which sits in the feedback path of the first toggle flip flop of the clock divider circuit 600B. The two to one MUX selects between the Q and Q-bar of the flip flop. Although this may cause a glitch at the output of the MUX, the glitch may be hidden because the MUX may not be evaluated again until the next rising edge of the of the full rate clock. The output of the MUX is supplied to the clock divider circuit and causes the delay of a clock edge of the clock signal produced by the clock divider circuit by one clock cycle. The net result is that the divide by two clock is delayed by one full rate clock cycle. Because each edge of the divide by two clock is used to catch a single bit from the serial data stream, the delayed edge causes a single data bit to be slipped.

EXEMPLARY OPERATIONS IN ACCORDANCE WITH EMBODIMENTS OF THE PRESENT INVENTION

Figure 10:
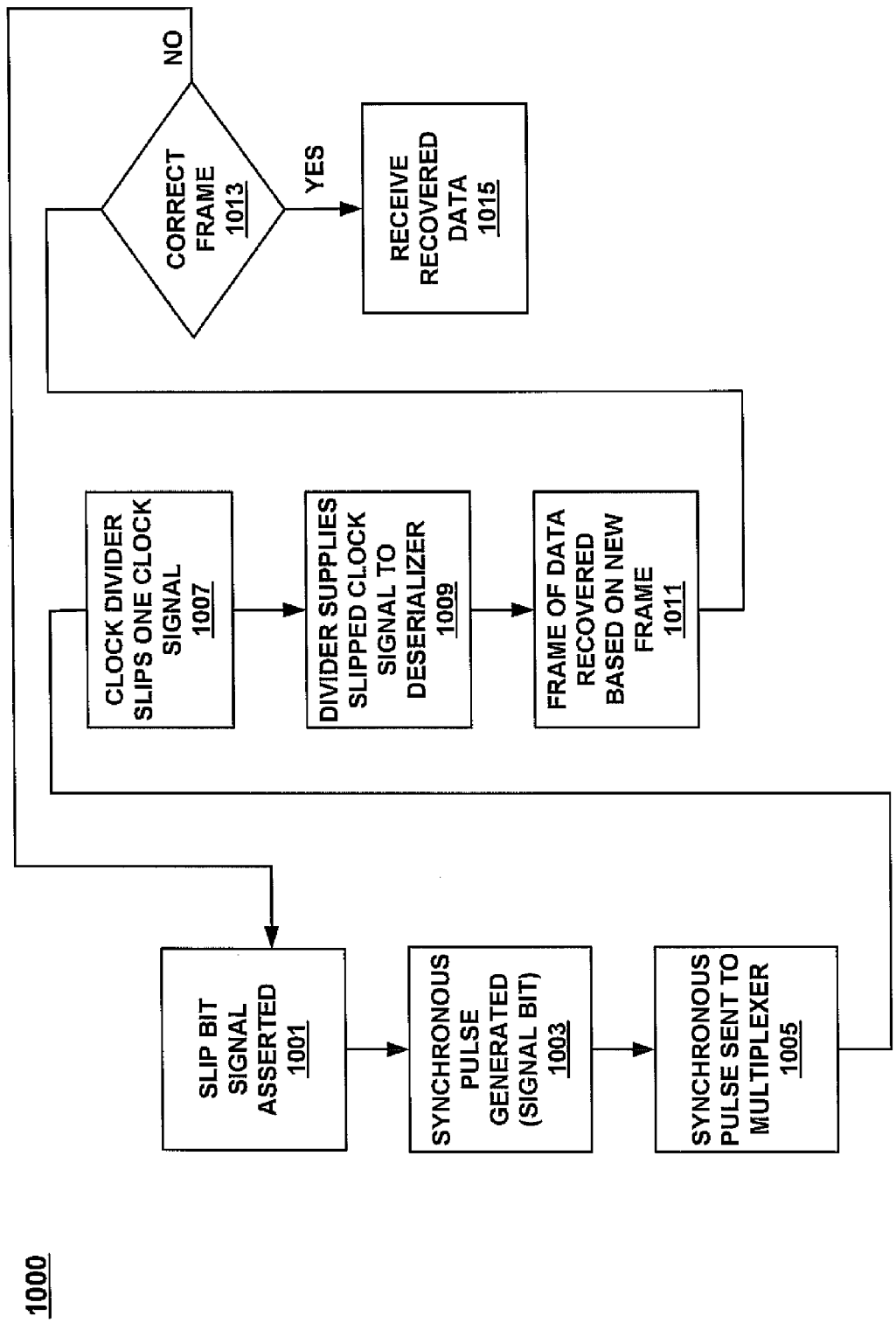
FIG. 10 is a flowchart of the steps performed in a process of cycle slip framing according to one embodiment of the present invention.

FIG. 10 is a flowchart 1000 of steps performed in accordance with one embodiment of the present invention. Flowchart 1000 includes processes of the present invention which, in one embodiment, are carried out by a receiver circuit, for instance, of a transceiver device. FIG. 10 is a flowchart of the steps performed in a process of cycle slip framing according to one embodiment of the present invention.

At step, 1001, a slip bit signal is received from an asynchronous control signal generator (external agent). According to exemplary embodiments, the asynchronous control signal generator (e.g., 801) generates an asynchronous control signal (slip bit signal) that triggers the operation of a slip bit mechanism (e.g., 600A).

At step, 1003, a synchronous pulse is generated after receiving said slip bit signal. According to one embodiment, the asynchronous slip bit signal received in step 1001 may be passed through a series of circuit components where it is synchronized to an internal full clock rate and is transformed into a synchronized control signal (e.g., synchronous pulse).

At step, 1005 the synchronous pulse is supplied to a component that operates to affect a bit slip that results in the moving of a character frame, wherein the moving of the character frame is prompted by a single control signal (the synchronous pulse). The synchronous pulse is used to trigger the delaying of a clock edge of clock signals that are supplied to a deserializer 1007 and 1009. Because each clock edge of the clock signal produced by a clock divider circuit is used to catch a single bit from a serial bit data stream, this delay causes a single data bit moving in the serial bit data stream to be slipped (missed) 1011. According to one embodiment this operation may be employed to facilitate the re-framing of data that has an indeterminate delay between transmitter and receiver. Slip bit mechanism facilitates the re-framing of data as framed at the transmitter by triggering data bit slips a single bit at a time until framing of incoming data is achieved at the receiver 1013 and 1015. Referring to FIG. 6, D type flip flops 603, 607, and 609, and AND gate 603 operate together to generate a synchronous pulse (equal in length to one full rate clock cycle) each time that a slip bit signal is received. This synchronous pulse may then be transmitted to a MUX (e.g., 611) which may generate a control signal (for transmission to the clock divider circuit) that can be employed to trigger a data bit slip.

The advantages of embodiments of the present invention include its "correct-by-design" configuration. Because embodiments of the present invention are entirely synchronous (all clocks are outputted directly from flip-flops of circuit 600B) even if the control signal 654 to the deserializer block is asynchronous, glitches that may cause invalid characters with unknown system effects may not enter the system. By contrast, in the conventional art implementations the clocks are outputted from an asynchronous combinational logic gate (EXOR). Thus, such circuits are not "correct-by design" as glitches may enter the system causing invalid characters to appear at the receiver.

Moreover, embodiments of the present invention, require a single control signal 652 to effect a bit-slip to affect a moving of the character frame. By contrast, conventional systems may require N control signals (e.g., N=4 for a 1-to-16 deserializer) to affect such moving. In addition, embodiments of the present invention require less circuitry than conventional systems because such systems may require additional circuitry to make the system synchronous (correct-by-design).

It should be appreciated that embodiments of the present invention may be implemented in any technology (e.g., CML, CMOS, TTL, etc.). In alternate embodiments, the MUX (see 611 in FIG. 6) could be replaced with an EXOR gate. Moreover, a DFF (see 603 in FIG. 6) could be replaced with a latch. If timing budgets allow the DFF (see 607 in FIG. 6) could be removed.

Embodiments of the present invention include the provision of a framing mechanism for serial data that uses a logical-state-machine to delete clock cycles used by a deserializer mechanism. Also described is a method for framing serial data that uses a logical-state-machine which controls the clock of the deserializer mechanism and performs the steps of dividing the incident clock by two for "normal" events. The method includes removing a clock cycle from the deserializer when requested by an external agent and resuming the usual clock divider function on the next clock cycle. According to one embodiment, the logical-state-machine (slip bit mechanism) may be comprised of four flip-flops and two logic gates to implement the divide by two/three function synchronously with the incident clock. According to one embodiment, the deserializer mechanism can be comprised of cascaded storage elements clocked by successively slower clocks. In yet another embodiment, the deserializer mechanism can be comprised of sequential storage elements clocked at the same rate with cascaded data flow, and a state machine to "unload" into another register at pre-determined times.

In addition, embodiments of the present invention allow a low-gate count method of cycle-slip framing to be combined with any deserializer architecture that uses each cycle of a divided clock to grab bits from a serial bit stream. In one embodiment it may be combined with the inherently low-power pipelined deserializer architecture to permit a complete low-power solution. It should be appreciated that this may be extremely important in the transceiver (PHY) marketplace (backplane and port) where power consumption is critical.

As noted above with reference to exemplary embodiments thereof, the present invention provides a method and system for cycle slip framing. The method includes receiving an asynchronous signal from a serial bit data stream and generating a synchronous pulse after receiving the asynchronous signal. The method further provides that the synchronous pulse be used to affect a bit slip that results in the moving of a character frame. According to one embodiment of the invention, the moving of the character frame is prompted by a single control signal.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of cycle slip framing comprising:
receiving a slip bit signal associated with a serial bit data stream into a logic circuit;
generating a synchronous pulse that is provided to a clock divider that is coupled to said logic circuit after receiving said slip bit signal; and
using said synchronous pulse to effect a bit slip in a deserializer that results in the moving of a character frame with respect to said data stream, wherein said moving of said character frame is performed in response to a single control signal of a said clock divider and wherein said deserializer recovers deserialized data according to said character frame.

2. The method of claim 1, wherein said receiving said slip bit signal results in the removal of a clock cycle of a clock signal of said clock divider supplied to said deserializer.

3. The method of claim 2, wherein said removal of a clock signal causes a skipping of a data bit from an incoming serial stream by said deserializer.

4. The method of claim 3, wherein said clock divider supplies a plurality of divided clocks to said deserializer and wherein each divided clock is supplied directly from an output of a sequential circuit.

5. The method of claim 3, wherein said generating a synchronous pulse comprises passing said slip bit signal through a series of sequential cells clocked at an internal full rate clock and wherein said slip bit signal is asynchronous.

6. The method of claim 5, wherein said slip bit signal is an asynchronous signal received from an external circuit and is coupled to one input of an AND gate.

7. The method of claim 6, wherein said AND gate comprises an output that is asserted for a full clock cycle after said synchronous slip bit signal transitions.

8. In a digital system, a method for generating an output clock signal comprising:
a) receiving an incident clock signal and dividing said incident clock signal by two to produce said output clock signal that is supplied to a deserializer;
b) removing a clock cycle from said output clock signal in response to receiving a slip bit signal into a logic circuit that generates a synchronous pulse that triggers said removing; and
c) resuming the generation of said output clock signal according to a) upon a next clock cycle following b) wherein said deserializer recovers deserialized data according to a character frame.

9. A method as described in claim 8 further comprising:
receiving said slip bit signal, wherein said slip bit signal is asynchronous to said digital system; and
synchronizing said slip bit signal to said incident clock signal.

10. A method as described in claim 9 further comprising:
dividing said output clock signal to produce a divided output clock signal; and
supplying said output clock signal and said divided output clock signal to clock different stages of said deserializer.

11. A method as described in claim 10 wherein said dividing said output clock is performed by a toggle flip-flop circuit.

12. A method as described in claim 10 further comprising:
supplying a serial data stream to said deserializer circuit; and
using said output clock signal and said divided output clock signal to recover said deserialized data at an output of said deserializer circuit according to said character frame, wherein said slip bit signal causes said character frame to shift by one bit position with respect to bit positions of said serial data stream.

13. A method as described in claim 12 further comprising:
generating said slip bit signal;
testing if a character recovered by said deserializer circuit is an expected framing character; and
repeating said generating said slip bit signal and said testing until said character recovered by said deserializer circuit is said framing character.

14. A receiver circuit comprising:
a logic circuit receiving a slip bit signal and for generating a synchronized slip bit signal in response thereto;
a clock divider circuit for:
a) dividing an internal clock signal by two to produce an output clock signal;

b) removing a clock cycle from said output clock signal in response to receiving said synchronized slip bit signal;

c) resuming the generation of said output clock signal according to a) upon a next clock cycle following b); and d) generating a plurality of divided output clock signals based on said output clock signal; and a deserializer circuit for recovering deserialized data according to a character frame based on an input serial data stream and further based on said output clock signal and said plurality of divided output clock signals.

15. A receiver circuit as described in claim 14 wherein said slip bit signal causes said character frame to shift by one bit position with respect to bit positions of said serial data stream.

16. A receiver circuit as described in claim 14 wherein said d) is performed by a plurality of toggle flip-flops coupled in a serial fashion and wherein said slip bit signal received by said logic circuit is asynchronous to said receiver circuit.

17. A receiver circuit as described in claim 14 wherein said slip bit signal received by said logic circuit is asynchronous to said receiver circuit and wherein further said logic circuit comprises four sequential circuits and two logic gates.

18. A receiver circuit as described in claim 14 wherein said deserializer circuit comprises N stages which each receive a respective output clock signal of said output clock signal and said plurality of divided output clock signals.

19. A receiver circuit as described in claim 14 wherein said b) and said c) are performed by a multiplexer coupled in a feedback path of a sequential circuit.

20. A receiver circuit as described in claim 15 wherein said slip bit signal is externally generated during a framing period of said receiver circuit and wherein said receiver circuit is integrated within a receiver channel of a transceiver circuit.

* * * * *